United States Patent

[11] 3,628,163

[72] Inventor Anthony D. Heibel
Nunica, Mich.
[21] Appl. No. 846,849
[22] Filed Aug. 1, 1969
[45] Patented Dec. 14, 1971
[73] Assignee Ufad Corporation

[54] FILTER SYSTEM
2 Claims, 2 Drawing Figs.

[52] U.S. Cl. .......... 328/167, 332/41
[51] Int. Cl. .......... H03b 1/04
[50] Field of Search .......... 328/137, 138, 166, 167; 332/41; 333/70 A

[56] References Cited

UNITED STATES PATENTS

| | | | |
|---|---|---|---|
| 3,081,434 | 3/1963 | Sandberg | 328/167 X |
| 3,307,408 | 3/1967 | Thomas et al. | 328/167 X |
| 3,375,451 | 3/1968 | Borelli et al. | 328/167 |
| 3,377,557 | 4/1968 | Heibel | 328/166 X |

*Primary Examiner*—Roy Lake
*Assistant Examiner*—James B. Mullins

ABSTRACT: The operation of this electronic filter is based on the interrelation of two similar sections operating upon a complex electric input signal, each section including a first signal multiplier, a low-pass filter, and a second multiplier. Multiplying the input signal by the reference signal in the first multiplier produces two frequency components for each frequency component of the input signal. All the signals that the low-pass filter does not eliminate, are multiplied by the reference signal in the second multiplier. Each signal multiplied in the second multiplier produces two sidebands equally spaced on either side of the reference signal. Another and similar section of the system operates with a reference signal of the same frequency and magnitude, but 9° out of phase with respect to the reference signal applied to the first section. The outputs of the two sections are added. The result is the cancellation of one sideband and the addition of the other sideband causing a regeneration of each frequency component of the input signal within the passband.

INVENTOR.
Anthony D. Heibel
BY
Glenn B. Guerra [signature]
ATTORNEY

FILTER SYSTEM

BACKGROUND OF THE INVENTION

Low-pass, high-pass and band-pass filters are recognized types of devices for discriminating between frequency components of complex electric signals. Almost any electronic system (i.e., radar, sonar, communications, etc.) will contain functions similar to that of one of these forms of filter. The conventional filter system is based either upon the action of a particular resistor-capacitor system or upon the resonant characteristics of a capacitance-inductance network. The transmission characteristics of filters of practically any description have been sufficiently investigated so that their performance can be predicted accurately with conventional mathematical procedures. In summary, any filter will exhibit a particular transmission pattern which is a function of the frequency of the applied signal. The problem with these filter circuits centers in a number of objectionable characteristics that seems to be inevitably associated with them. These may be summarized as follows:

1. Passbands cannot be made narrow enough for adequate elimination of noise.
2. Tuning operations are frequently delicate and time consuming, and changes in the environment produce sufficient physical changes in the circuit components to require frequent retuning where precision is necessary.
3. Center frequency and band width are not readily adjustable by the conventional circuit arrangements, and consequently these arrangements do not lend themselves to sweep-frequency operations.
4. Phase shift induced by the circuit components is too great, and/or not predictable.
5. Bandwidth increases with an increase in center frequency.
6. It is not possible to pass more than one spectrum of frequencies simultaneously with one filter.

SUMMARY OF THE INVENTION

The operation of a system incorporating the present invention is based upon the characteristics of a conventional signal multiplier. In such a device, a random collection of input signals is multiplied by a carefully defined reference signal. The standard result of this multiplication is the generation of two frequencies for each frequency present in the input signal. These characteristics of standard multipliers are utilized by interrelating a group of multipliers and attenuation devices in a particular arrangement to produce the filter system. Where it is desirable to analyze a complex input signal for components of predetermined frequencies, it is preferable to consider that each input frequency contains two parts having a sine-cosine relationship to some arbitrary time reference, or that these components are 90° out of phase with respect to each other.

A system incorporating the preferred form of the present invention arranges one section for analysis of the input signal with respect to what may be considered as the sine phase of the reference signal, and the other section of the system to analyze the input signal with respect to the cosine phase of the reference signal. These sections of the total system are essentially the same in arrangement. A first multiplier receives the total input signal, and multiplies it by either the sine or the cosine function of the reference signal, and AC output components of this multiplier outside a predetermined bandwidth are attenuated, or grounded out. The resulting low-frequency components are delivered to a second multiplier, which also receives the same reference signal as the first multiplier. The output of the second multiplier is essentially two side bands equally separated from the reference frequency, for each input frequency within the passband. The other section of the system is similarly arranged, and the outputs of the two sections are fed into a device capable of addition. The result of this operation is to eliminate one sideband corresponding to each input frequency from each section (by cancellation). The other sidebands add to reproduce all frequencies of the input signal which are within the passband. The output of each section is fed back against the input signal in conventional closed-loop arrangement to eliminate that portion of the input signal spectrum which is passed by the two sections of the system. That portion of the input signal which remains is the band-reject output.

In the special case where there is an input frequency component the same as the reference frequency, the two sidebands converge to zero for that component. The output of the second multiplier is an AC signal of the same phase and frequency as the reference signal and has an amplitude proportional to the in-phase (with respect to the reference signal) part of the input signal. When the outputs of the two sections are added, the input signal component is reproduced without magnitude or phase error in this special case.

DESCRIPTION OF THE PREFERRED EMBODIMENT

Figure 1:
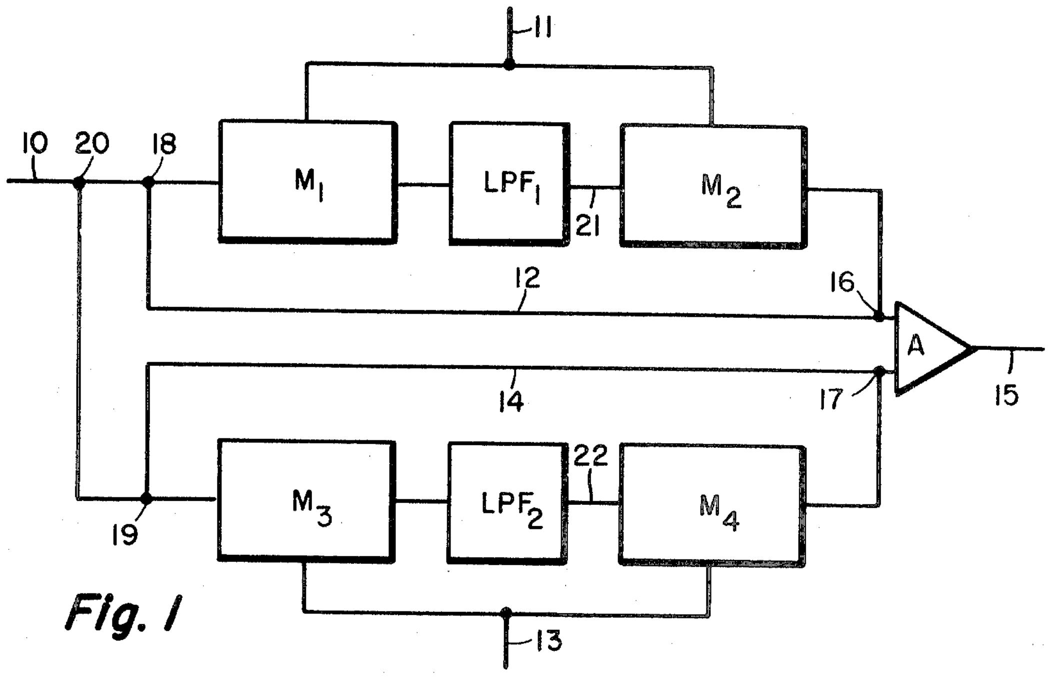
FIG. 1 of the drawing presents a schematic diagram showing the interrelationship of standard components to produce the present invention.

Referring to the schematic diagram, a complex input signal may be considered as applied to the line 10. A reference frequency is applied to the line 11. The multiplier $M_1$ produces the multiplication of the input signal by the reference signal, which generates two frequency components related to each frequency component of the input signal. This output is delivered to the low-pass filter ($LPF_1$) which removes all frequency components which are greater than the reference frequency and passes any DC signals and a selectable range of AC signals between DC and the reference frequency. It is this selectable characteristic which allows bandwidth control. The output of the low-pass filter ($LPF_1$) is delivered to the second multiplier ($M_2$). The two multipliers, together with the low-pass filter, constitute one section of the device. Normally, this section will be supplied with a reference voltage at the line 11, which may be considered as one phase of the reference signal.

The output of the second multiplier consists of two sidebands for each frequency component of the input signal. These sidebands are equally separated from the reference frequency. The second section of the system, which includes the multipliers $M_3$ and $M_4$, and the low-pass filter $LPF_2$, functions in the same manner with respect to a signal of reference frequency applied at the line 13, which is 90° out of phase with respect to the signal applied at line 11, and is of the same magnitude. The line 14 provides the feedback relationship for the second section, as a counterpart to the line 12 of the first section. The two sets of sidebands are added in the adder A, lines 16 and 17, and the addition results in the reproduction of only the input frequencies within a predetermined bandwidth. This is due to the fact that one sideband from one section cancels a sideband from the other section, and the remaining sidebands reproduce the input signal within the passband at line 15.

As a preliminary to proceeding with a theoretical analysis of the circuit relationships involved in the schematic diagram, the following index of terms is presented:

$\sin wt$, $\cos wt$ = phases of reference signal (with implied coefficients of unit voltage)

$e_{in}$ = input voltage (signal) at line 10

$e_{in} = A_2 \sin wt + A_1 \cos (w+\epsilon)t + A_3 \sin (w+\epsilon)t$ $A_1, A_2, A_3$ = constants $\epsilon$ = deviation from center frequency $w$ within bandwidth, in radians/sec.

$K\int_0^t e(t)dt$ = expresses an integrator, one kind of low-pass filter $e_1(t)$ = voltage at 22
$e_o\ (t)$ = output signal voltage at 17
$e_o\ (t)$ = output signal voltage at 16
$B_1, B_2$ = constants
$D_1, D_2$ = constants
$E$ = constant $$N=1+\left(\frac{2\epsilon}{K(T)}\right)^2$$

$K(T)=K\times K_1\times K_2$ = total forward loop gain
$K_1$ = gain constant of first multiplier
$K_2$ = gain constant of second multiplier
$K$ = gain constant of integrator (LPF)
$M$ = multiplier (1)

$$e_1(t)=\int_0^t(e_{in}+e_{o1})KK_1\cos wt\,dt=KK_1\Big\{\int_0^t[E\cos^2 wt+A_2\sin wt\cos wt+(A_3+B_1)\sin(w+\epsilon)t\cos wt+(A_1+D_1)\cos(w+\epsilon)t\cos wt+B_2\sin(w-\epsilon)t\cos wt+D_2\cos(w-\epsilon)t\cos wt]\Big\}$$

$$=KK_1\Big\{\left[\frac{A_2}{4w}\cos 2wt\right]_0^t-(A_3+B_1)\left[\frac{\cos\epsilon t}{2\epsilon}+\frac{\cos(2w+w\epsilon)t}{2(2w+\epsilon)}\right]_0^t+(A_1+D_1)\left[\frac{\sin\epsilon t}{2\epsilon}+\frac{\sin(2w+\epsilon)t}{2(2w+\epsilon)}\right]_0^t+\frac{E}{2}-B_2\left[\frac{\cos(-\epsilon)t}{-2}-\frac{\cos 2w-\epsilon)t}{2(2w-\epsilon)}\right]_0^t+D_2\left[\frac{\sin(-\epsilon)t}{-2\epsilon}+\frac{\sin(2w-\epsilon)t}{2(2w-\epsilon)}\right]_0^t$$

Since terms containing 2 w do not get through the low-pass filter, (2) $$e_1\simeq KK_1\left[-(A_3+B_1)\left(\frac{\cos\epsilon t}{2\epsilon}-\frac{1}{2\epsilon}\right)+(A_1+D_1)\frac{\sin\epsilon t}{2\epsilon}+B_2\left(\frac{\cos\epsilon t}{2\epsilon}-\frac{1}{2\epsilon}\right)+D_2\frac{\sin\epsilon t}{2\epsilon}+\frac{Et}{2}\right]$$

(3) $$e_{o_1}=e_1K_2\cos wt$$

Combining (2) and (3), (4) $$e_{o_1}=\frac{KK_1K_2}{2\epsilon}[(B_2-A_3-B_1)(\cos\epsilon t-1)\cos wt+(A_1+D_1+D_2)\sin\epsilon t\cos wt+Et\epsilon\cos wt]$$

Regrouping, (5) $$e_{o_1}=\frac{K(T)}{2\epsilon}\{(Et\epsilon-B_2+A_3+B_1)\cos wt+\frac{B_2-A_3-B_1}{2}[\cos(w+\epsilon)t+\cos(w-\epsilon)t]+\frac{A_1+D_1+D_2}{2}[\sin(w+\epsilon)t-\sin(w-\epsilon)t]\}$$

Defining the output voltage in terms of undetermined coefficients:

(6) $e_o = B_1\sin(w+\epsilon)t + B_2\sin(W-\epsilon)t + D_1\cos(w+\epsilon)t + D_2\cos(w-\epsilon)t + E\cos wt$ Equating like coefficients in (5) and (6), and solving for the undetermined coefficients in terms of the input signal coefficients, (5)-(6) (a) $$B_2-A_3-B_1=\frac{4\epsilon}{K(T)}\cdot D_1=\frac{4\epsilon}{K(T)}\cdot D_2$$

(b) $$A_1+D_1+D_2=\frac{4\epsilon}{K(T)}\cdot B_1=-\frac{4\epsilon}{K(T)}\cdot B_2$$

(c) $$Et\epsilon-B_2+A_3+B_1=\frac{2\epsilon}{K(T)}\cdot E$$

(c) $$E\left(\frac{2\epsilon}{K(T)}-t\epsilon\right)=-B_2+A_3+B_1$$

(a) $$-A_3-2B_1=\frac{4\epsilon}{K(T)}\cdot D_1$$

(b) $$A_1+2D_1=\frac{4\epsilon}{K(T)}\cdot B_1$$

(a) $$-\frac{A_3}{2}-\frac{4\epsilon}{2K(T)}\cdot D_1=B_1$$

(b) $$\frac{A_1K(T)}{4\epsilon}+\frac{2K(T)}{4\epsilon}\cdot D_1=B_1$$

(a)-(b) $$-\frac{A_3}{2}-A_1\cdot\frac{K(T)}{4\epsilon}-\frac{2\epsilon}{K(T)}\cdot D_1-\frac{K(T)}{2\epsilon}\cdot D_1=0$$

$$-\frac{A_3}{2}-A_1\cdot\frac{K(T)}{4\epsilon}=D_1\left(\frac{2\epsilon}{K(T)}+\frac{K(T)}{2\epsilon}\right)$$

$$-\frac{\epsilon}{K(T)}\cdot A_3-\frac{A_1}{2}=D_1\left[\left(\frac{2}{K(T)}\right)^2+1\right]$$

$$D_2=D_1=\frac{-A_3\cdot\frac{\epsilon}{K(T)}-\frac{A_1}{2}}{1+\left(\frac{2\epsilon}{K(T)}\right)^2}=\frac{-A_3\cdot\frac{\epsilon}{K(T)}-\frac{A^1}{2}}{N}$$

$$B_1=-B_2=\frac{A_1\cdot\frac{\epsilon}{K(T)}-\frac{A_3}{2}}{N}$$

(5)-(6)

(c) $$E=\frac{-B_2+A_3+B_1}{\frac{2\epsilon}{K(T)}-t\epsilon}=\frac{A_3+\frac{2\left[\frac{A_1\epsilon}{K(T)}-\frac{A_3}{2}\right]}{N}}{\frac{2\epsilon}{K(T)}-t\epsilon}$$

(c) $$E=\frac{A_3+\left(\frac{2\epsilon}{K(T)}\right)^2\cdot A_3-A_3+\frac{2\epsilon}{K(T)}\cdot A_1}{\left[\frac{2\epsilon}{K(T)}-t\epsilon\right]N}=\frac{A_1+A_3\cdot\left(\frac{2\epsilon}{K(T)}\right)}{\left(1-\frac{tK(T)}{2}\right)N}$$

(c) $$E=\frac{A_1+A_3\cdot\frac{2\epsilon}{K(T)}}{N\left(1-\frac{tK(T)}{2}\right)}$$

(7) $$D_2=D_1=\frac{-A_3\cdot\frac{\epsilon}{K(T)}-\frac{A_1}{2}}{N}$$

(8) $$B_1=-B_2=\frac{A_1\cdot\frac{\epsilon}{K(T)}-\frac{A_3}{2}}{N}$$

(9) $$E=\frac{A_1+A_3\cdot\frac{2\epsilon}{K(T)}}{\left(1-\frac{tK(T)}{2}\right)N}$$

Using the sine reference for side two and the same mathematical procedure, and defining $E$ as the coefficient of sin $wt$ at the output:

$$(10)\quad E=\frac{A_2+\frac{2}{tK(T)}\left[\frac{A_3-\frac{2\epsilon}{K(T)}\cdot A_1}{N}\right]}{\frac{2}{tK(T)}-1}$$

$$\lim_{t\to 0} E=\frac{-A_3-\frac{2\epsilon}{K(T)}\cdot A_1}{N}$$

$$\lim_{t\to\infty} E=-A_2$$

$$\text{where: } N=1+\left(\frac{2\epsilon}{K(T)}\right)^2$$

$$(11)\quad B_1=B_2=\frac{-A_1\cdot\frac{\epsilon}{K(T)}-\frac{A_3}{2}}{N}$$

$$(12)\quad D_1=-D_2=\frac{A_3\cdot\frac{\epsilon}{K(T)}-\frac{A_1}{2}}{N}$$

Applying the cosine reference signal to line 13, the steady-state output at line 17 is:

$$(13)\quad e_{o_1}=\frac{\frac{A_1\epsilon}{K(T)}-\frac{A_3}{2}}{N}[\sin (w+\epsilon)t-\sin (w-\epsilon)t]$$

$$\frac{\frac{A_3\epsilon}{K(T)}+\frac{A_1}{2}}{N}[\cos (w+\epsilon)t+\cos (w-\epsilon)t]$$

Applying the sine reference signal to line 11, the steady-state output at line 16 is:

$$(14)\quad e_{o2}=-A_2\sin wt+\frac{\frac{A_1\epsilon}{K(T)}-\frac{A_3}{2}}{N}[\sin (w+\epsilon)t+\sin w-\epsilon)t]$$

$$-\frac{\frac{A_3\epsilon}{K(T)}+\frac{A_1}{2}}{N}[\cos (w+\epsilon)t-\cos (w-\epsilon)t]$$

The output at line 15 is the sum of the signals at lines 16 and 17, ($e_o$ +$e_o$ ), and can be written as:

$$(15)\quad e_o=e_{o_1}+e_{o_2}=-A_2\sin wt$$

$$+\frac{\frac{2A_1\epsilon}{K(T)}+A_3}{N}[\sin (w+\epsilon)t]-\frac{\frac{2A_3\epsilon}{K(T)}+A_1}{N}[\cos (w+\epsilon)t]$$

The phase shift, $\phi$, through the filter is:

$$(16)\quad -\phi=\tan^{-1}\frac{2\epsilon}{K(T)}\quad \lim_{\epsilon\to 0}\phi=0$$

The amplitude error, $e_{in}-e_o$, through the filter is:

$$(17)\quad A_1\left[\frac{1}{\sqrt{1+\frac{4\epsilon^2}{K(T)^2}}}-1\right]=A_1\left[\frac{1}{\sqrt{N}}-1\right]$$

The amplitude response (roll-off) characteristic is:

$$(18)\quad \frac{e_o}{e_{in}}=\frac{1}{\sqrt{\frac{4\epsilon^2}{K(T)^2}+1}}=\frac{1}{\sqrt{N}}$$

The standard definition for band width is the −3 db point on the amplitude response curve, which is:

$$(19)\quad \text{Band width}=\frac{e_o}{e_{in}}=\frac{1}{\sqrt{2}}=\frac{1}{\sqrt{N}}$$

Therefore:

$$(20)\quad N=2$$

and $$(21)\quad \epsilon=\frac{K(T)}{2}$$

Therefore bandwidth is directly proportional to open loop gain.

Since the sum of the signals at 16 and 17 is fed back against the input, the result is the elimination of that portion of the input signal spectrum which is passed by each section of the system. That portion of the input signal which remains is the band reject output (at point 20). If a DC voltage is applied as a reference signal, the circuit becomes a filter having a low-pass characteristic at 15, and a high-pass characteristic at 20.

Bandwidth is directly proportional to the total forward loop gain (equation 21). Forward loop gain, in turn, is controlled by the following parameters: (1) gain constants of the multipliers, which may be considered as including the magnitude constants of the reference voltage, and (2) gain constant of the low-pass filters. These items present several options for bandwidth control. The circuit rolloff characteristics are determined by the rolloff characteristics of the low-pass filter, and also by the forward loop gain (equation 18). The circuit rolloff increases with an increase in rolloff of the low-pass filter, and decreases with an increase in forward loop gain. Any arbitrary rolloff characteristic can be achieved within a predetermined bandwidth by adding lag networks to the low-pass filter.

This system provides simultaneously in-phase (line 16) and out of phase (line 17) components of total center frequency signal (equations 13 and 14). The phase shift of output with respect to the input of frequencies other than center, within the bandwidth, is directly related to the frequency deviation from center (equation 16). This phase shift can be read by standard meter devices, or the difference in frequency between points 11 (or 13) and 15 can be measured to obtain the phase shift. In other words, this system produces a phase shift which is a predictable function of the distance from center frequency within the bandwidth. The amplitude response error through the filter with respect to the input frequencies, other than center frequency, within the bandwidth, is directly related to the frequency deviation from center frequency (equation 17). This amplitude response error can be read by standard meter devices, or the difference in frequency between lines 11 (or 13) and 15 can be measured to determine the amplitude error. In other words, this system produces an amplitude response error which is a predictable function of the distance from center frequency within the bandwidth.

Equations 16 and 17 show that when the output frequency is the same as the reference frequency, there is no amplitude or phase error through the filter.

When the reference frequency is changed so that it is the same as the output frequency there is no amplitude or phase error through the filter. This can be accomplished utilizing standard measuring devices and circuits.

It is significant that the circuit can be operated either as a high-pass (point 20)–low-pass filter (point 15), or as a band-pass (point 15)–band reject filter (point 20). This circuit can also be operated to pass or reject multiple bands, each with different bandwidths or identical bandwidths simultaneously. This is done by applying two or more frequencies as a reference signal to either the first multiplier, or to both multipliers. Different bandwidths are controlled by the respective amplitudes of the different reference frequency components.

The operation performed by multipliers $M_2$ and $M_4$ is that of a balanced modulator, therefore balanced modulators could be used in their place. The operation performed by $M_1$ and $M_3$ could be duplicated using an amplifier whose transfer function is controlled by the magnitude and polarity of a control voltage.

Figure 2:
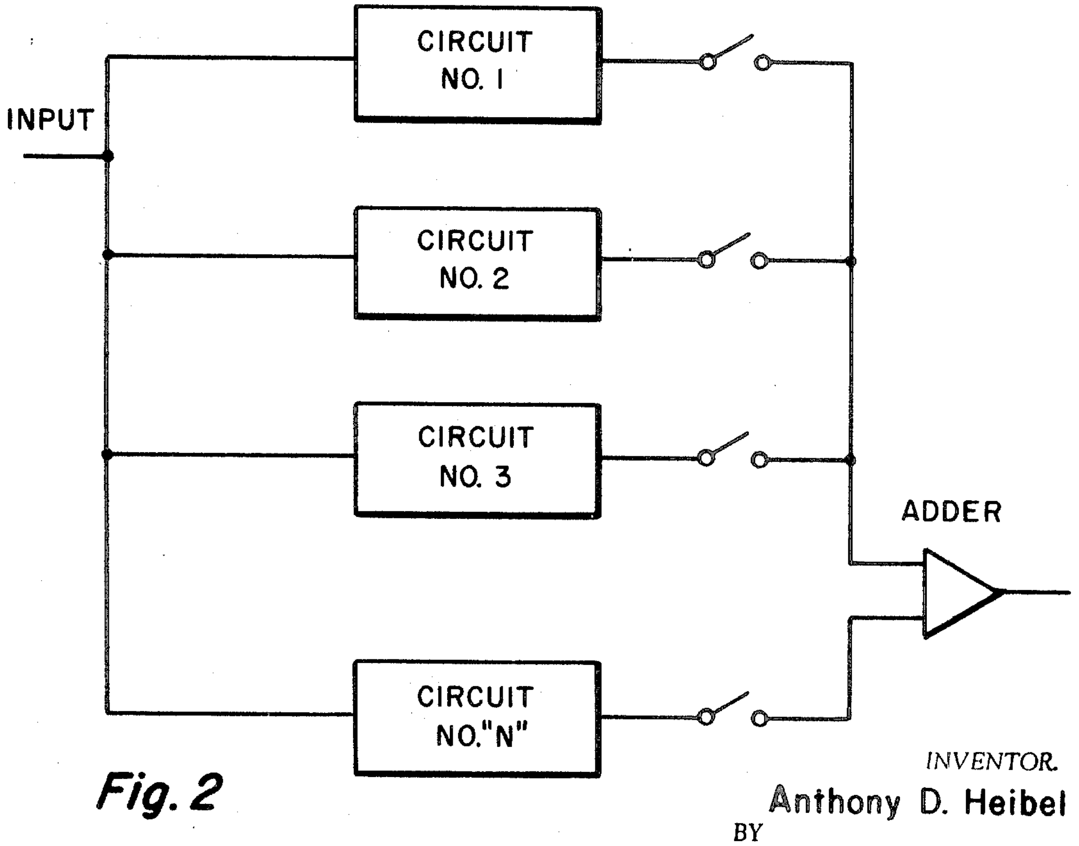
FIG. 2 is a schematic diagram of a system for analyzing an input signal over a reference spectrum.

Several variations are possible in the circuit described above and shown in FIG. 1. For example any number of sides described in FIG. 1 could be connected as shown in FIG. 2, to perform at least two functions: (1) Extract any number of phase components of an AC signal, or (2) sample and/or sweep any number of bandwidths simultaneously. In FIG. 2, each "circuit" is a section including a first multiplier, a low-pass filter, a second multiplier and a feedback connection, as shown in FIG. 1. Each of these circuits can be selectively coupled to an adder by switches in the illustrated arrangement.

Any number of phase components can be extracted from an AC signal by applying a different phase reference to each side shown in FIG. 2, each of the same frequency. The output of each side is that portion of the input signal which is in phase with and of the same frequency as the reference signal.

Any number of bandwidths can be sampled and/or swept simultaneously by applying a different reference frequency signal to each side. Each side can be independently controlled in bandwidth and sweep rate. Once an output signal is noted from any side another side can be connected to form a pair of sides as shown in FIG. 1, and the total input signal in that pass-band can be produced as an output.

I claim:

1. A system for filtering complex electric signals, comprising:

a pair of sections, each including:

a first multiplying device;

circuit means adapted to deliver a complex input signal and a reference signal to said multiplying device whereby the said signals may be multiplied;

an integrator operatively connected to receive the output of said first multiplier;

a second multiplier, operatively connected to receive the output of said integrator, and also to receive said reference signal, whereby said signal and integrator output may be multiplied; and feedback circuit means connecting the output of said second multiplier to the input to said first multiplier; and An adder operatively connected to add the outputs of said second multipliers, said sections receiving similar reference signals displaced in phase relationship, respectively.

2. A method of filtering a complex electric signal, comprising:

multiplying said complex signal by a reference signal in a first multiplying operation;

subjecting the output of said first multiplying operation to an integrator;

multiplying the output of said integrator by a reference signal in a second multiplying operation;

feeding back the output of said second multiplying operation against the said complex signal;

performing the above-recited operations in sequence on said complex signal using a reference signal of the same frequency and displaced in phase from said first-named reference signal; and adding the outputs of both second multiplying operations.

* * * * *